(12) United States Patent
Sikazwe

(10) Patent No.: US 12,144,329 B2
(45) Date of Patent: Nov. 19, 2024

(54) CANINE WATER TANK AND HOUSING DEVICE

(71) Applicant: Fukamanji Sikazwe, Midland, TX (US)

(72) Inventor: Fukamanji Sikazwe, Midland, TX (US)

( * ) Notice: Subject to any disclaimer, the term of this patent is extended or adjusted under 35 U.S.C. 154(b) by 0 days.

(21) Appl. No.: 17/831,625

(22) Filed: Jun. 3, 2022

(65) Prior Publication Data
US 2023/0389517 A1 Dec. 7, 2023

(51) Int. Cl.
*A01K 7/00* (2006.01)
*A01K 7/02* (2006.01)

(52) U.S. Cl.
CPC .................... *A01K 7/025* (2013.01)

(58) Field of Classification Search
USPC ...... 119/74, 72, 51.01, 52.1, 51.5; D30/121, D30/132, 133, 129
See application file for complete search history.

(56) References Cited

U.S. PATENT DOCUMENTS

| | | | | |
|---|---|---|---|---|
| 586,878 A * | 7/1897 | Stewart | ................... | B43L 25/02 119/77 |
| 1,755,706 A * | 4/1930 | St George | ............ | A01K 1/0356 119/464 |
| 2,791,984 A * | 5/1957 | Franklin | .............. | A01K 5/0291 119/51.5 |
| 3,340,851 A * | 9/1967 | Frank | ................... | A01K 5/0291 119/51.13 |
| 3,646,913 A * | 3/1972 | Jenkins | ................ | A01K 5/0291 119/51.13 |
| 3,720,184 A * | 3/1973 | Pearce | ................. | A01K 5/0225 119/51.5 |
| 3,874,341 A * | 4/1975 | Riba | .................... | A01K 5/0291 119/51.5 |
| 3,985,104 A * | 10/1976 | Klemer | ................ | A01K 5/0291 119/51.5 |
| 5,000,121 A * | 3/1991 | Daily | .................... | A01K 31/08 119/461 |
| D335,939 S * | 5/1993 | Cooper | ........................ | D30/122 |
| 5,433,171 A * | 7/1995 | Ewell | ....................... | A01K 7/02 119/51.5 |
| 5,488,927 A * | 2/1996 | Lorenzana | ............... | A01K 7/02 119/51.5 |
| 5,588,394 A * | 12/1996 | Balistreri | ............. | A01K 5/0275 119/51.5 |
| 5,628,276 A | 5/1997 | Raposa | | |
| 5,735,231 A * | 4/1998 | Terenzi | ................ | A01K 5/0291 119/51.11 |
| 6,062,166 A * | 5/2000 | Macrina | ................... | A01K 7/02 119/51.11 |

(Continued)

FOREIGN PATENT DOCUMENTS

WO WO2016200486 12/2016

*Primary Examiner* — Andrea M Valenti

(57) ABSTRACT

A canine water tank and housing device includes a cabinet having an access door. An aperture extends through a front wall of the cabinet. A base has a reservoir removably couplable to a hollow bottle. A bowl is insertable through the aperture. The bowl is used to contain a fluid from the bottle. A duct in the base defines a channel which is fluidically coupled to the reservoir and the bowl. The channel has a top end lower than a rim end of the bowl.

13 Claims, 7 Drawing Sheets

(56) References Cited

U.S. PATENT DOCUMENTS

| | | | |
|---|---|---|---|
| 6,971,331 B1* | 12/2005 | Rohrer | A01K 7/02 222/557 |
| 7,438,020 B2* | 10/2008 | Palett | F25D 23/12 119/51.11 |
| 8,146,535 B1* | 4/2012 | Neumann | A01K 7/027 119/72 |
| 8,646,413 B2 | 2/2014 | Padia | |
| 10,098,321 B2* | 10/2018 | McKay | A01K 7/00 |
| 2006/0144339 A1* | 7/2006 | Walker | A01K 5/0291 119/51.5 |
| 2006/0249089 A1 | 11/2006 | Behuin | |
| 2007/0277738 A1* | 12/2007 | Dentsbier | A01K 7/02 119/77 |
| 2008/0257273 A1* | 10/2008 | Carter | A01K 39/0206 119/72 |
| 2015/0282453 A1* | 10/2015 | Rogers | A01K 7/06 119/72 |
| 2016/0037744 A1 | 2/2016 | Rudin | |
| 2018/0055006 A1* | 3/2018 | Alford | A01K 5/00 |
| 2019/0216050 A1* | 7/2019 | Gevaert | A01K 5/0225 |

* cited by examiner

CANINE WATER TANK AND HOUSING DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to water dispensers for pets and more particularly pertains to a new water dispenser for pets for containing and dispensing water for a canine or other animal to drink without posing a spill hazard.

(2) Description of Related Art Including Information Disclosed Under 37 CFR 1.97 and 1.98

The prior art relates to water dispensers and vessels for pets which avoid spilling of the water by pets or other sources through various means, including fastening a drinking vessel to a ground or other surface, positioning the vessel within a recess within a surface, including an "non-skid" material meant to secure the vessel by friction, and including a wide apron a pet must stand on to drink from the vessel. But the prior art does not relate to water dispenser that enclose a water tank in an area inaccessible to the pet while permitting the pet access to a drinking vessel fluidically coupled to the water tank.

BRIEF SUMMARY OF THE INVENTION

An embodiment of the disclosure meets the needs presented above by generally comprising a cabinet having a plurality of walls defining an interior space and having an access door through a side wall of the plurality of walls. The access door is moveable between an open position and a closed position, wherein the access door is securable in the closed position. An aperture extends through a front wall of the plurality of walls of the cabinet.

A base comprises a hollow reservoir, a bowl, and a duct. The reservoir is removably couplable to a hollow bottle, said bottle being configured to contain a fluid. The reservoir is fluidically coupled to the bottle when the reservoir is coupled to the bottle. The bowl is insertable through the aperture. The bowl is also configured to contain the fluid and to permit a canine or other animal to drink the fluid through a rim end of the bowl. The duct defines a channel which is fluidically coupled to the reservoir and the bowl, the channel has a top end lower than the rim end of the bowl. The base is removably positionable such that the reservoir is positioned within the interior space of the cabinet, the duct extends through the aperture, and the bowl is positioned without the interior space.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
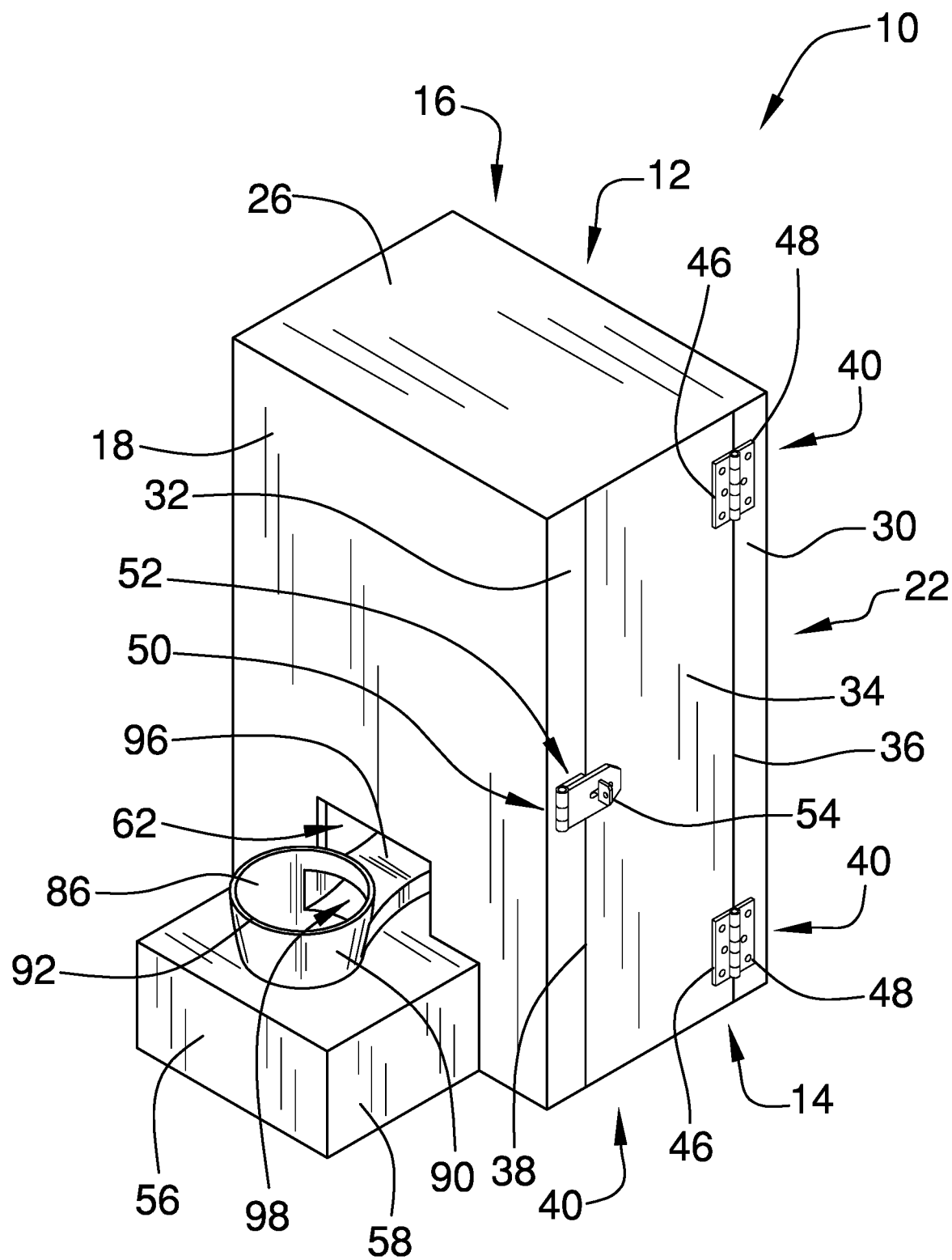
FIG. 1 is a top front side perspective view of a canine water tank and housing device according to an embodiment of the disclosure with the access door closed.
Figure 2:
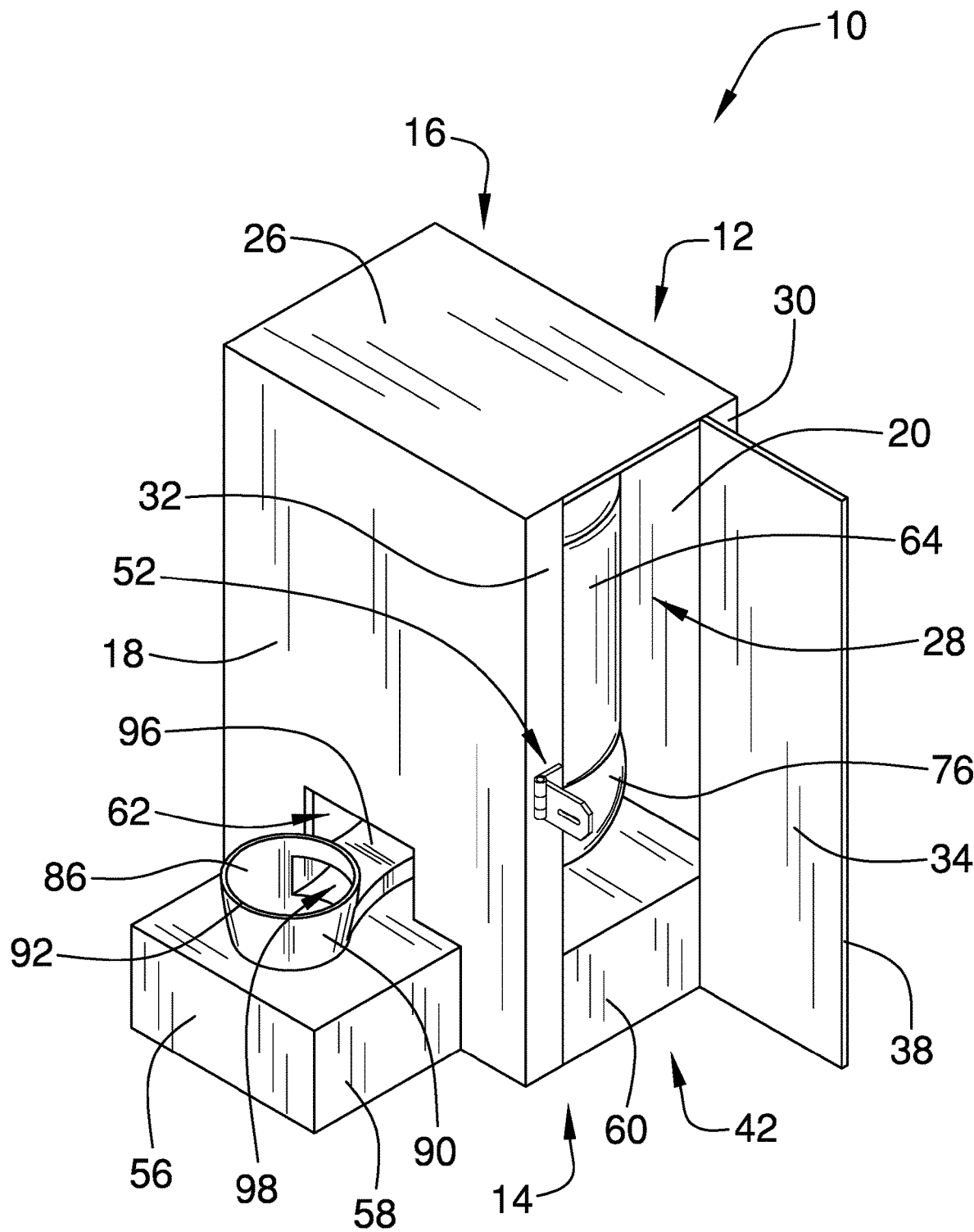
FIG. 2 is a top front side perspective view of an embodiment of the disclosure with the access door open.
Figure 3:
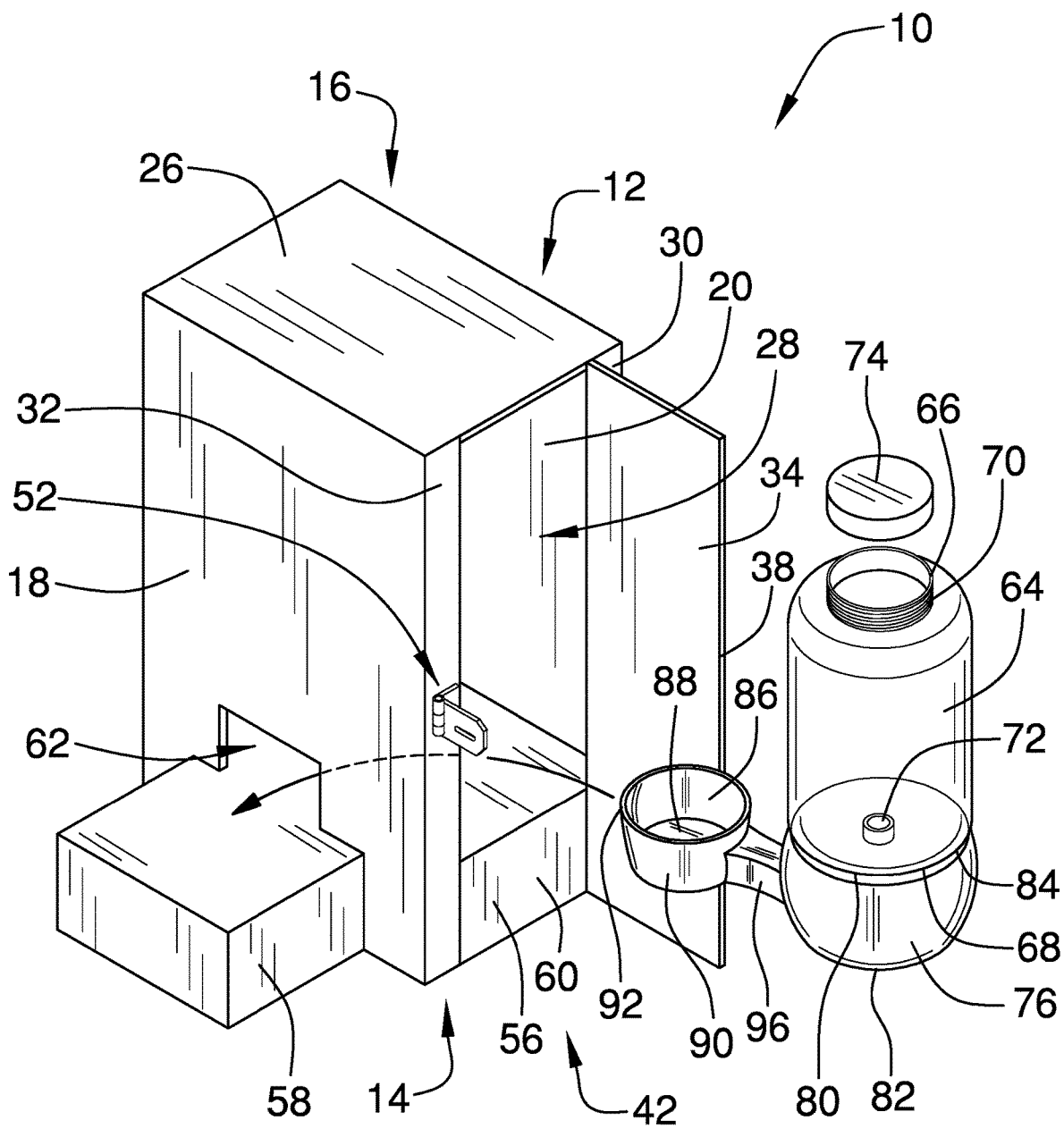
FIG. 3 is an exploded perspective view of an embodiment of the disclosure.
Figure 4:
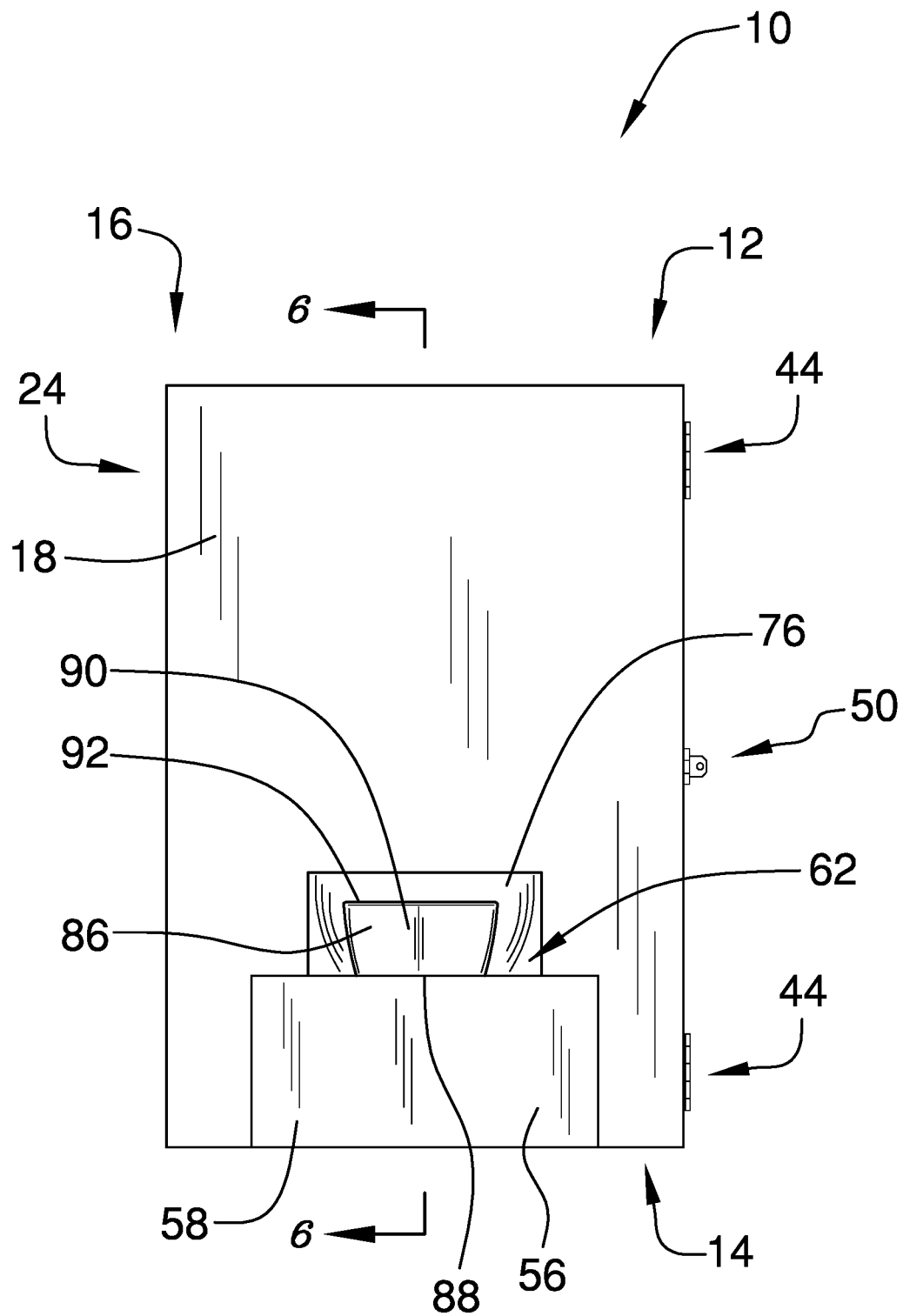
FIG. 4 is a front view of an embodiment of the disclosure.
Figure 5:
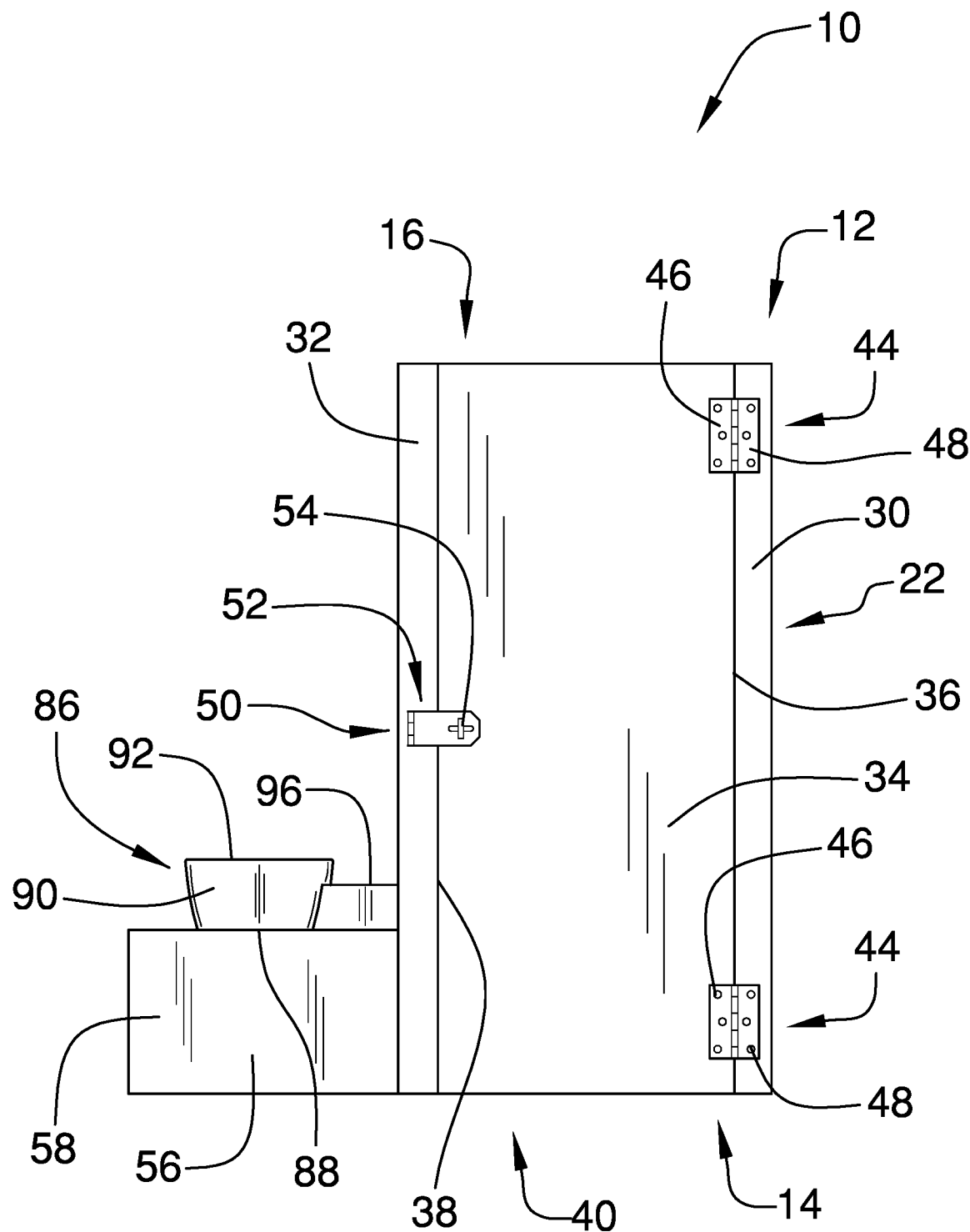
FIG. 5 is a side view of an embodiment of the disclosure.
Figure 6:
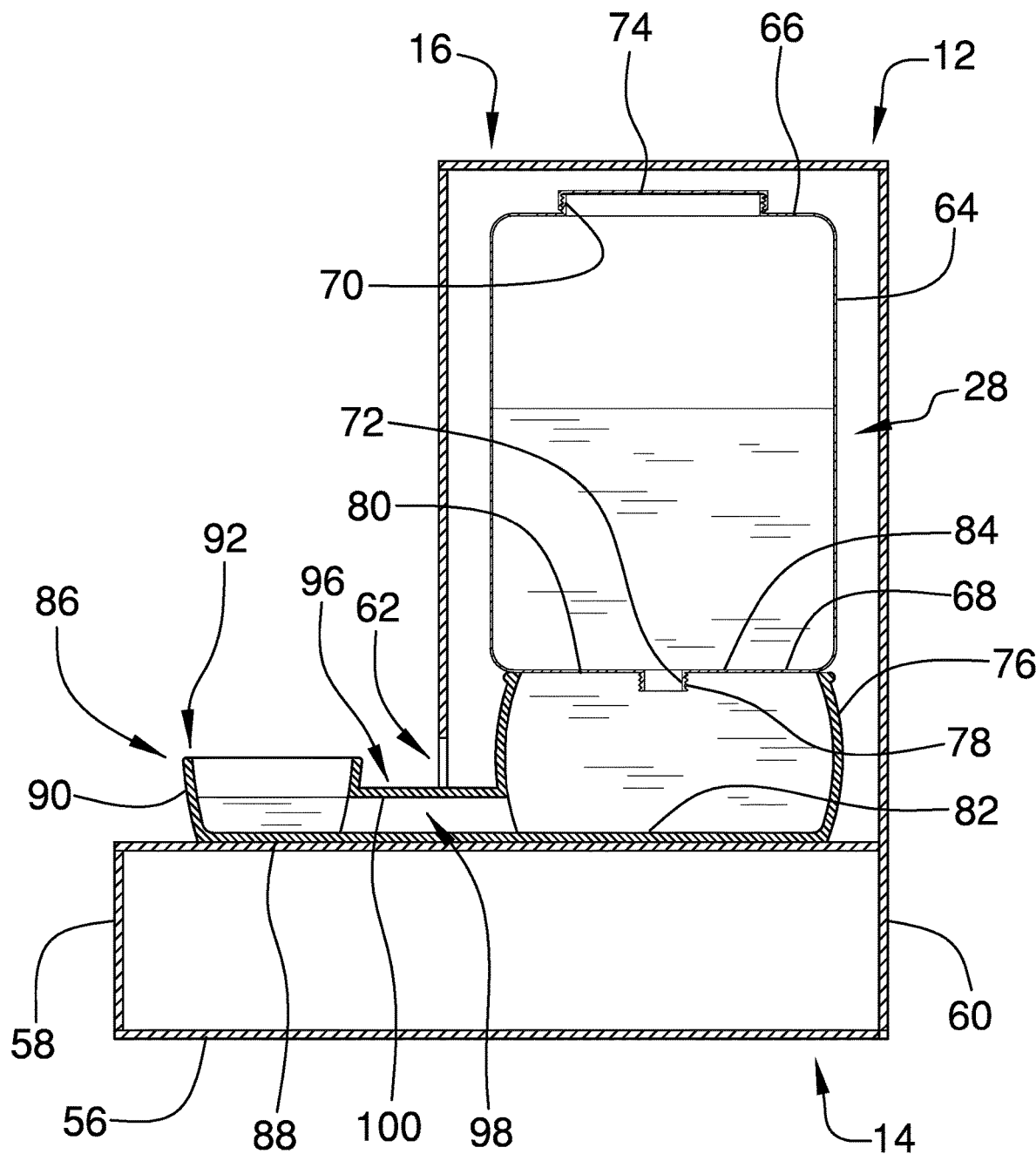
FIG. 6 is a cross-sectional view of an embodiment of the disclosure in the direction of arrows 6-6 in FIG. 4.
Figure 7:
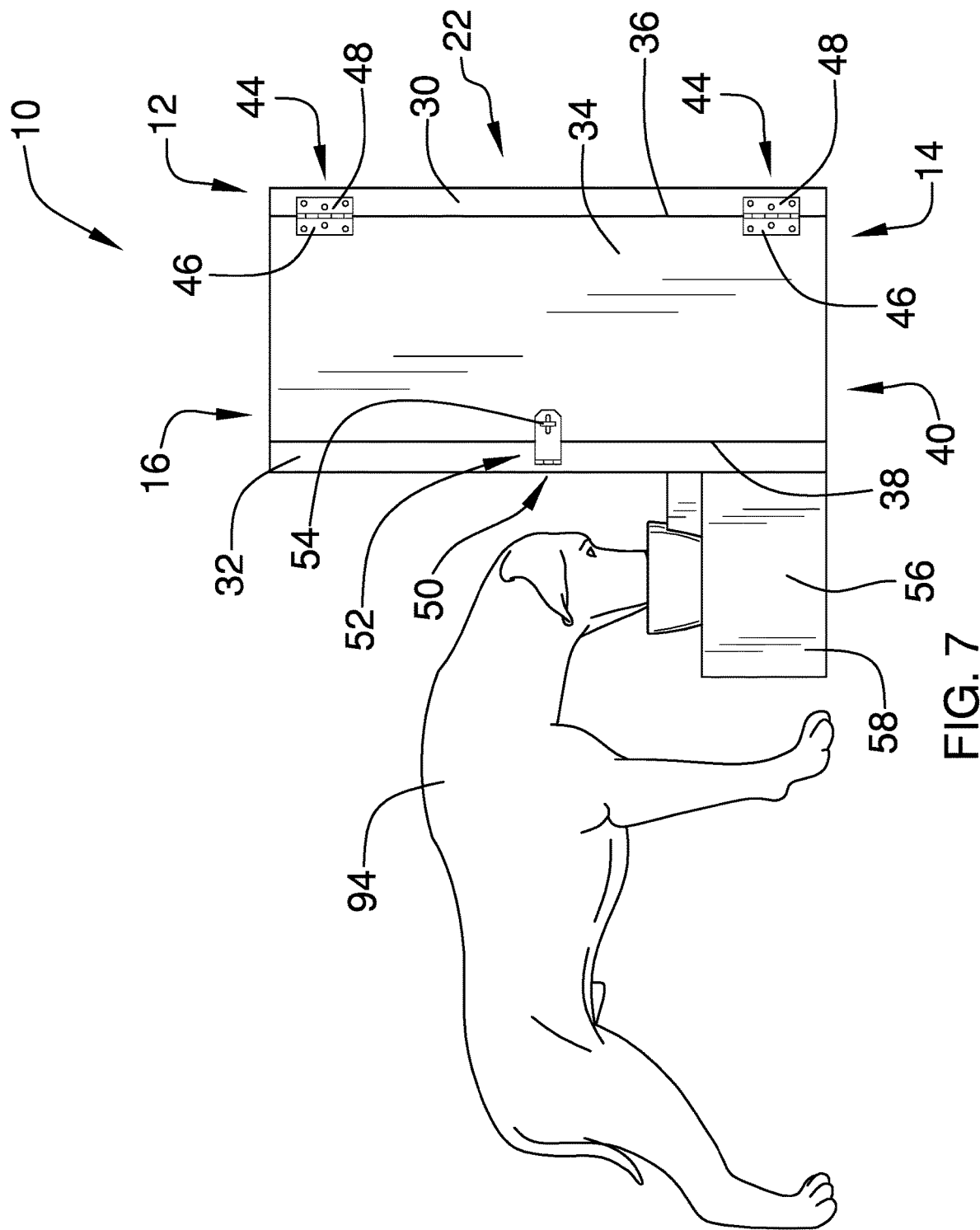
FIG. 7 is an in-use side view of an embodiment of the disclosure.

With reference now to the drawings, and in particular to FIGS. 1 through 7 thereof, a new water dispenser for pets embodying the principles and concepts of an embodiment of the disclosure and generally designated by the reference numeral 10 will be described.

As best illustrated in FIGS. 1 through 6, the canine water tank and housing device 10 generally comprises a cabinet 12 having a bottom end 14 and a top end 16. A front wall 18, a back wall 20, a first side wall 22, and a second side wall 24 of said cabinet 12 extend from the bottom end 14 to the top end 16 of the cabinet 12. The cabinet 12 has a top wall 26 extending from the front wall 18 to the back wall 20 and from the first side wall 22 to the second side wall 24. Collectively, the walls define an interior space 28. The first side wall 22 has a back jamb 30 coupled to the back wall 20 and a front jamb 32 coupled to the front wall 18.

An access door 34 is pivotably coupled to the back jamb 30. The access door 34 has a first vertical edge 36 and a second vertical edge 38, wherein the access door 34 is pivotable between a closed position 40 and an open position 42 about a vertical axis proximate to the first vertical edge 36. Each of a plurality of hinges 44 has a first hinge section 46 pivotably coupled to a second hinge section 48, wherein each first hinge section 46 is coupled to the access door 34 and each second hinge section 48 is coupled to the back jamb 30. Each first hinge section 46 pivots about the vertical axis. A latch 50 comprises a jamb section 52 coupled to the front jamb 32 and a door section 54 coupled to the access door 34 proximate the second vertical edge 38. The jamb section 52 is removably couplable to the door section 54 when the access door 34 is in the closed position 40 such that the latch 50 secures the access door 34 in the closed position 40.

A platform 56 has an exterior section 58 and an interior section 60, the interior section 60 extending from the front wall 18 to the back wall 20 and from the first side wall 22 to the second side wall 24, and the exterior section 58 extending away from the front wall 18. A rectangular aperture 62 extends through the front wall 18 above and adjacent to the platform 56.

A bottle 64 extends from a lid end 66 to a reservoir end 68. The bottle 64 is hollow and is configured to contain a fluid. The bottle 64 has a first port 70 protruding from the lid end 66 and a second port 72 protruding from the reservoir end 68, and each of the first port 70 and the second port 72 is externally threaded. The first port 70 has a diameter that is greater than a diameter of the second port 72. A lid 74 is internally threaded and is complementary in shape to the first port 70. The lid 74 is removably couplable to the first port 70 for selectively opening and closing the first port 70. The bottle 64 is configured to receive the fluid through the first port 70 when the first port 70 is open.

A hollow reservoir 76 extends from a top surface 80 to a bottom surface 82. The reservoir 76 has an internally threaded receiver 78 extending downward from the top surface 80 which is complementary in shape to the second port 72 such that the reservoir 76 is removably couplable to the bottle 64. A resting surface 84 of the bottle 64 abuts the top surface 80 of the reservoir 76 when the reservoir 76 is coupled to the bottle 64, and the reservoir 76 is fluidically coupled to the bottle 64 when the receiver 78 is coupled to the second port 72.

A bowl 86 has a base 88 and a substantially cylindrical perimeter wall 90 extending upward from the base 88 to a rim end 92 of the bowl 86. The bowl 86 is insertable through the aperture 62 and is configured to contain the fluid. The bowl 86 is also configured to permit a canine 94 or other animal to drink the fluid through the rim end 92 of the bowl 86. A duct 96 extends from the reservoir 76 to the bowl 86, the duct 96 defining a channel 98 which is fluidically coupled to the reservoir 76 and the bowl 86. The channel 98 has a top end 100 lower than the rim end 92 of the bowl 86. The reservoir 76, the duct 96, and the bowl 86 are collectively removably positionable on the platform 56 such that the reservoir 76 is positioned within the interior space 28 of the cabinet 12, the duct 96 extends through the aperture 62, and the bowl 86 is positioned without the interior space 28.

In use, the bottle 64 is coupled to the reservoir 76 and filled with the fluid. Then the lid 74 is coupled to the bottle 64. With the access door 34 open the bottle 64, the lid 74, and the reservoir 76 are positioned within the interior space 28 of the cabinet 12 on top of the platform 56 such that the bowl 86 is positioned without the cabinet 12 and the duct 96 extends through the aperture 62. Then the access door 34 is closed and latched shut, preventing interference by the canine 94 or other animal with the components within the interior space 28 of the cabinet 12.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A canine water tank and housing device comprising:
   a cabinet having a plurality of solid walls defining an interior space and having an access door through a side wall of said plurality of solid walls, said access door being moveable between an open position and a closed position, said access door being securable in said closed position, said cabinet having a bottom end configured for resting on a support surface;
   an aperture through a front wall of said plurality of solid walls of said cabinet;
   a bottle being hollow and being configured to contain a fluid;
   a base comprising a hollow reservoir, a bowl, and a duct, wherein said reservoir, said bowl, and said duct are integrally connected such that said bowl is in a fixed position relative to said reservoir and said duct,
      wherein said reservoir is removably couplable to said bottle, said reservoir being fluidically coupled to said bottle when said reservoir is coupled to said bottle,
      wherein said bowl is passable through said aperture to a position outside of said cabinet while said bottle is coupled to said reservoir and positioned within interior space, said bowl being configured to contain the fluid, said bowl being configured to permit a canine to drink the fluid through a rim end of said bowl,
      wherein said duct defines a channel, said channel being fluidically coupled to said reservoir and said bowl, said channel having a top end lower than said rim end of said bowl,
      wherein said base is removably positionable such that said reservoir is positioned within said interior space of said cabinet, said duct extends through said aperture, and said bowl is positioned without said interior space; and
   a platform, said platform having an interior section and an exterior section, said interior section being positioned within said interior space, said exterior section extending away from said front wall, said aperture being positioned above and adjacent to said exterior section, said base being removably positionable on said platform such that said reservoir is positioned within said interior space of said cabinet, said duct extends through said aperture, and said bowl is positioned without said interior space, said platform having a bottom panel defining said bottom end of said cabinet and a top panel being horizontal to and spaced above said bottom panel wherein said platform is configured for spacing said base from the support surface.

2. The device of claim 1, wherein said access door is pivotably coupled to said side wall.

3. The device of claim 2, further comprising a plurality of hinges each hinge having a first hinge section pivotably coupled to a second hinge section about a hinge axis, each said first hinge section coupled to said access door, each said second hinge section coupled to said side wall, wherein said access door is pivotably coupled to said side wall about said hinge axis.

4. The device of claim 1, further comprising a latch, said latch comprising a wall section coupled to said side wall and a door section coupled to said access door, said wall section being removably couplable to said door section when said access door is in said closed position, said latch securing said access door in said closed position when said wall section is coupled to said door section.

5. The device of claim 1, wherein said interior section of said platform extends laterally to each of said plurality of solid walls.

6. The device of claim 1, wherein said exterior section of said platform has a width less than a width of said front wall.

7. The device of claim 1, wherein said platform has a horizontal top surface extending across said interior section and said exterior section.

8. The device of claim 1, wherein said aperture is rectangular.

9. The device of claim 1, wherein said bottle has a reservoir port protruding from an end of said bottle, said reservoir port being externally threaded, said reservoir having a receiver being internally threaded and complementary in shape to said reservoir port, said reservoir port being removably couplable to said receiver such that said bottle is fluidically coupled to said reservoir through said reservoir port when said reservoir port is coupled to said receiver.

10. The device of claim 9, wherein said receiver is positioned through a top surface of said reservoir, said bottle having a resting surface which abuts said top surface of said reservoir when said bottle is coupled to said reservoir.

11. The device of claim 1, further comprising an internally threaded lid, wherein said bottle has an externally threaded lid port complementary in shape to said lid, said lid being removably couplable to said lid port for selectively opening and closing said lid port, said bottle being configured to receive the fluid through said lid port when said lid port is open.

12. The device of claim 1, wherein said base has a horizontal bottom surface that extends across said reservoir, said duct, and said bowl.

13. A canine water tank and housing device comprising:
a cabinet having a bottom end and a top end wherein said bottom end is configured for resting on a support surface, said cabinet having a plurality of solid walls including a front wall, a back wall, a first side wall, and a second side wall extending from said bottom end to said top end of said cabinet, said cabinet having a top wall extending from said front wall to said back wall and from said first side wall to said second side wall, said plurality of solid walls defining an interior space, said first side wall having a back jamb coupled to said back wall and a front jamb coupled to said front wall;
an access door being pivotably coupled to said back jamb, said access door having a first vertical edge and a second vertical edge, said access door being pivotable about a vertical axis proximate to said first vertical edge, said access door being pivotable between a closed position and an open position;
a plurality of hinges, each said hinge having a first hinge section pivotably coupled to a second hinge section, each said first hinge section coupled to said access door, each said second hinge section coupled to said back jamb, each said first hinge section pivoting about said vertical axis;
a latch comprising a jamb section coupled to said front jamb and a door section coupled to said access door proximate said second vertical edge, said jamb section being removably couplable to said door section when said access door is in said closed position, said latch securing said access door in said closed position when said jamb section is coupled to said door section;
a platform having an exterior section and an interior section, said interior section extending from said front wall to said back wall and from said first side wall to said second side wall, said exterior section extending away from said front wall;
an aperture through said front wall above and adjacent to said platform, said aperture being rectangular;
a bottle extending from a lid end to a reservoir end, said bottle being hollow and being configured to contain a fluid, said bottle having a first port protruding from said lid end and a second port protruding from said reservoir end, wherein each of said first port and said second port is externally threaded, said first port having a diameter that is greater than a diameter of said second port;
a lid being internally threaded and being complementary in shape to said first port, said lid being removably couplable to said first port for selectively opening and closing said first port, said bottle being configured to receive the fluid through said first port when said first port is open;
a hollow reservoir extending from a top surface to a bottom surface, said reservoir having an internally threaded receiver extending downward from said top surface, said receiver being complementary in shape to said second port such that said reservoir is removably couplable to said bottle, wherein a resting surface of said bottle abuts said top surface of said reservoir when said reservoir is coupled to said bottle, said reservoir being fluidically coupled to said bottle when said receiver is coupled to said second port;
a bowl having a base and a substantially cylindrical perimeter wall extending upward from said base to a rim end of said bowl, said bowl being configured to contain the fluid, said bowl being configured to permit a canine to drink the fluid through said top end of said bowl;
a duct extending from said reservoir to said bowl, said duct defining a channel, said channel being fluidically coupled to said reservoir and said bowl, said channel having a rim end lower than said rim end of said bowl, wherein said reservoir, said duct, and said bowl are collectively removably positionable on said platform such that said reservoir is positioned within said interior space of said cabinet, said duct extends through said aperture, and said bowl is positioned without said interior space;

wherein said platform has a bottom panel defining said bottom end of said cabinet and a top panel being horizontal to and spaced above said bottom panel wherein said platform is configured for spacing said bowl from the support surface; and wherein said reservoir, said bowl, and said duct are integrally connected such that said bowl is in a fixed position relative to said reservoir and said duct, said bowl being passable through said aperture to a position outside of said cabinet while said bottle is coupled to said reservoir and positioned within interior space.

* * * * *